US012566669B2

(12) United States Patent
Wu et al.

(10) Patent No.: US 12,566,669 B2
(45) Date of Patent: Mar. 3, 2026

(54) APPLICATION-CONSISTENT DISASTER RECOVERY FOR CONTAINER-BASED APPLICATIONS

(71) Applicant: Huawei Technologies Co., Ltd., Shenzhen (CN)

(72) Inventors: Ning Wu, Northborough, MA (US); Hongliang Tang, Hopkinton, MA (US); Zhihao Tang, Shrewsbury, MA (US); Lili Chen, Hopkinton, MA (US); Li Wan, Hopkinton, MA (US); Feng Zhang, West Roxbury, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 18/433,019

(22) Filed: Feb. 5, 2024

(65) Prior Publication Data

US 2024/0176703 A1 May 30, 2024

Related U.S. Application Data

(63) Continuation of application No. PCT/US2021/071131, filed on Aug. 6, 2021.

(51) Int. Cl.
G06F 11/14 (2006.01)

(52) U.S. Cl.
CPC ................................ G06F 11/1402 (2013.01)

(58) Field of Classification Search
CPC ... G06F 11/1402; G06F 11/1446–1469; G06F 11/2094; G06F 2201/82; G06F 2201/84
See application file for complete search history.

(56) References Cited

U.S. PATENT DOCUMENTS

| 2015/0378847 A1* | 12/2015 | Tarasuk-Levin .... G06F 11/2023 714/19 |
| 2019/0213086 A1* | 7/2019 | Vallala ................ G06F 9/44526 |

(Continued)

FOREIGN PATENT DOCUMENTS

WO WO-2022231664 A1 11/2022

OTHER PUBLICATIONS

"International Application Serial No. PCT/US2021/071131, International Search Report mailed May 17, 2022", 4 pgs.

(Continued)

*Primary Examiner* — Michael Maskulinski
(74) *Attorney, Agent, or Firm* — Schwegman Lundberg & Woessner, P.A.

(57) ABSTRACT

An efficient structure and methodology for container-based applications are provided for disaster recovery for data in a storage system using application consistency groups for replication from the storage system to a disaster recovery system. Application consistency groups can be generated containing applications, a disaster recovery plan, and a disaster recovery policy, where each application has a consistency level. The applications in an application consistency group can include stateless applications and stateful applications. The replication of an application consistency group from the system to a disaster recovery storage system can be controlled according to the disaster recovery policy, the disaster recovery plan, and the consistency levels of the application consistency group.

20 Claims, 5 Drawing Sheets

(56)    References Cited

U.S. PATENT DOCUMENTS

2019/0220444 A1*  7/2019  Guo ................... G06F 9/45558
2020/0034254 A1*  1/2020  Natanzon ............... G06F 9/455
2021/0120039 A1   4/2021  Bett et al.
2022/0147391 A1*  5/2022  Balcha ................. G06F 11/328

OTHER PUBLICATIONS

"International Application Serial No. PCT/US2021/071131, Written Opinion mailed May 17, 2022", 8 pgs.

* cited by examiner

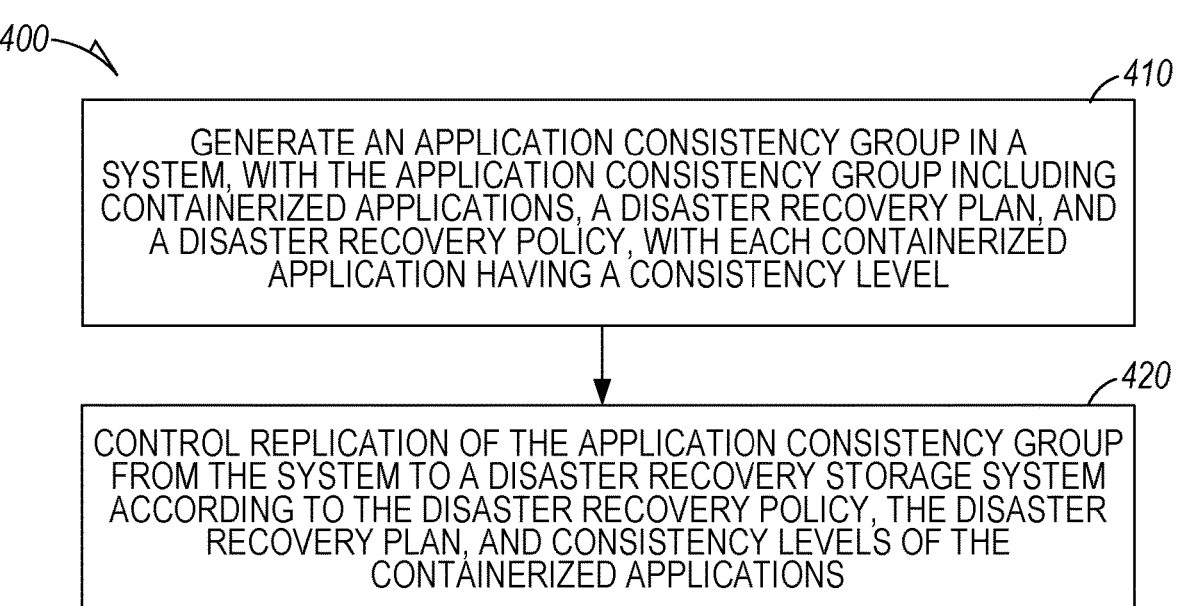

400

410

GENERATE AN APPLICATION CONSISTENCY GROUP IN A
SYSTEM, WITH THE APPLICATION CONSISTENCY GROUP INCLUDING
CONTAINERIZED APPLICATIONS, A DISASTER RECOVERY PLAN, AND
A DISASTER RECOVERY POLICY, WITH EACH CONTAINERIZED
APPLICATION HAVING A CONSISTENCY LEVEL

420

CONTROL REPLICATION OF THE APPLICATION CONSISTENCY GROUP
FROM THE SYSTEM TO A DISASTER RECOVERY STORAGE SYSTEM
ACCORDING TO THE DISASTER RECOVERY POLICY, THE DISASTER
RECOVERY PLAN, AND CONSISTENCY LEVELS OF THE
CONTAINERIZED APPLICATIONS

*FIG. 4*

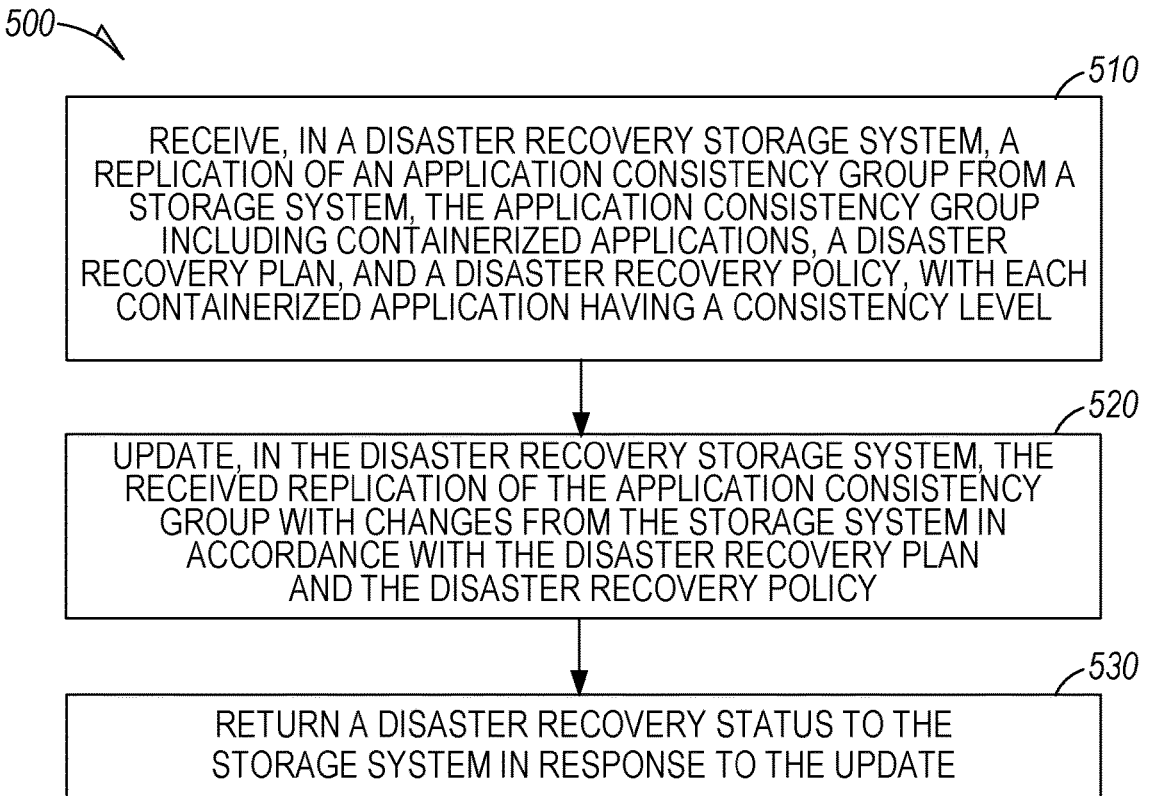

500

510

RECEIVE, IN A DISASTER RECOVERY STORAGE SYSTEM, A
REPLICATION OF AN APPLICATION CONSISTENCY GROUP FROM A
STORAGE SYSTEM, THE APPLICATION CONSISTENCY GROUP
INCLUDING CONTAINERIZED APPLICATIONS, A DISASTER
RECOVERY PLAN, AND A DISASTER RECOVERY POLICY, WITH EACH
CONTAINERIZED APPLICATION HAVING A CONSISTENCY LEVEL

520

UPDATE, IN THE DISASTER RECOVERY STORAGE SYSTEM, THE
RECEIVED REPLICATION OF THE APPLICATION CONSISTENCY
GROUP WITH CHANGES FROM THE STORAGE SYSTEM IN
ACCORDANCE WITH THE DISASTER RECOVERY PLAN
AND THE DISASTER RECOVERY POLICY

530

RETURN A DISASTER RECOVERY STATUS TO THE
STORAGE SYSTEM IN RESPONSE TO THE UPDATE

*FIG. 5*

APPLICATION-CONSISTENT DISASTER RECOVERY FOR CONTAINER-BASED APPLICATIONS

CROSS-REFERENCE TO RELATED APPLICATIONS

This application is a continuation of International Application No. PCT/US2021/071131, filed 6 Aug. 2021, entitled "APPLICATION-CONSISTENT DISASTER RECOVERY FOR CONTAINER-BASED APPLICATIONS," which application is incorporated herein by reference in its entirety.

TECHNICAL FIELD

The present disclosure is related to container-based applications and, in particular, to providing backup, disaster recovery, or mobility for container-based applications.

BACKGROUND

In recent years, container-based application deployment has become popular. A container is a form of encapsulation to limit a resource and restrict access of a process, which can involve packaging up software code and all its dependencies such that it can run uniformly and consistently on any infrastructure. Containerization aims to decouple applications and associated structure for running the applications from the infrastructure on which they run. Containers can use persistent storage that is deliverable in a variety of ways, such as but not limited to software-defined in a container orchestrator and in external systems. Persistent storage refers to a data storage device that retains data after power to that device is shut off. There are many container orchestration platforms being developed to schedule containers across multiple hosts.

In addition, applications capable for containerization can have different characteristics. For example, an application can be a stateless application or a stateful application. With respect to an application, stateful and stateless describe whether the application, running on a computing device, is designed to note and remember one or more preceding events in a given sequence of interactions with a user, another computing device, another program, a device, or other outside element. Stateful refers to the state of interaction being tracked, usually by setting values in a storage field designated for that purpose. Stateless refers to there being no record of previous interactions and each interaction request has to be handled based entirely on information that comes with it. A stateless application is deployed in a "stateless way" in that there are no states (persistent variables) needed in between two instances. Due to this flexibility, stateless applications can be terminated and restarted as needed and can run anywhere. In contrast, stateful applications rely on states and the stateful applications will lose their meaning if those states are lost. One example of a stateful application is a banking application, which relies on states, such as account information, saved in databases. If the states are lost, the banking application will be in a corrupted condition.

SUMMARY

It is an object of various embodiments to provide an efficient architecture and methodology for container-based applications to provide for disaster recovery for data in a storage system using application consistency groups for replication from the storage system to a disaster recovery system. Application consistency groups can be generated containing applications, a disaster recovery plan, and a disaster recovery policy, where each application has a consistency level. The applications in an application consistency group can have different levels of consistency with respect to an event affecting protection of data. An application consistency group provides a control unit to support backup and disaster recovery for multiple applications and physical volumes of data. The disaster recovery policy of an application consistency group can define a recover point objective, a recovery time objective, storage type, consistency level, and other features for disaster recovery for the application consistency group. The disaster recovery plan of an application consistency group can define the characteristics and operations of the application consistency group. A disaster recovery—capable application consistency group can be controlled for both synchronous replication and asynchronous replication. Application programming interfaces based on the construct and architecture for an application consistency group can be implemented for storage to replication for disaster recovery readiness and disaster recovery.

According to a first aspect of the present disclosure, there is provided a system having disaster recovery capabilities, the system comprising a memory storing instructions and one or more processors in communication with the memory, wherein the one or more processors execute the instructions. The one or more processors execute the instructions to generate an application consistency group in the system, with the application consistency group including containerized applications, a disaster recovery plan, and a disaster recovery policy, with each containerized application having a consistency level. The one or more processors execute the instructions to control a replication of the application consistency group from the system to a disaster recovery storage system according to the disaster recovery policy, the disaster recovery plan, and the consistency levels.

In a first implementation form of the system having disaster recovery capabilities according to the first aspect as such, the disaster recovery policy defines the consistency levels for the containerized applications, with the consistency levels selectable from a crash consistency to an end-to-end application consistency.

In a second implementation form of the system having disaster recovery capabilities according to the first aspect as such or any preceding implementation form of the first aspect, the disaster recovery policy defines one or more of a recovery time objective, a recovery point objective, or a storage type for the disaster recovery storage system.

In a third implementation form of the system having disaster recovery capabilities according to the first aspect as such or any preceding implementation form of the first aspect, the disaster recovery plan defines characteristics or operations of the containerized applications.

In a fourth implementation form of the system having disaster recovery capabilities according to the first aspect as such or any preceding implementation form of the first aspect, the containerized applications include at least one stateful containerized application and at least one stateless containerized application.

In a fifth implementation form of the system having disaster recovery capabilities according to the first aspect as such or any preceding implementation form of the first aspect, the replication of the application consistency group to the disaster recovery storage system is system driven, orchestrator driven, or time driven.

In a sixth implementation form of the system having disaster recovery capabilities according to the first aspect as such or any preceding implementation form of the first aspect, one or more processors support synchronous replication and asynchronous replication of the application consistency group to the disaster recovery storage system.

In a seventh implementation form of the system having disaster recovery capabilities according to the first aspect as such or any preceding implementation form of the first aspect, the one or more processors are operable to make a dynamic change to the disaster recovery policy or the disaster recovery plan.

In an eighth implementation form of the system having disaster recovery capabilities according to the first aspect as such or any preceding implementation form of the first aspect, the one or more processors are operable to control behaviour of the disaster recovery storage system.

In a ninth implementation form of the system having disaster recovery capabilities according to the first aspect as such or any preceding implementation form of the first aspect, at least portions of the application consistency group are user-definable.

According to a second aspect of the present disclosure, there is provided a disaster recovery storage system. The disaster recovery storage system comprises a memory storing instructions and one or more processors in communication with the memory, wherein the one or more processors execute the instructions. The one or more processors execute the instructions to receive a replication of an application consistency group from a storage system, the application consistency group including containerized applications, a disaster recovery plan, and a disaster recovery policy, with each containerized application having a consistency level. The one or more processors execute the instructions to update the received replication of the application consistency group with changes from the storage system in accordance with the disaster recovery plan and the disaster recovery policy. The one or more processors execute the instructions to return a disaster recovery status to the storage system in response to the update.

In a first implementation form of the disaster recovery storage system according to the second aspect as such, the one or more processors are operable to provide the updated received replication of the application consistency group to the storage system in response to receiving a callback from the storage system or an orchestrator to the storage system.

In a second implementation form of the disaster recovery storage system according to the second aspect as such or any preceding implementation form of the second aspect, the one or more processors are operable to adjust behaviour of the disaster recovery storage system based on control from the storage system or an orchestrator to the storage system.

According to a third aspect of the present disclosure, there is provided a method of disaster recovery. The method comprises generating an application consistency group in a system, with the application consistency group including containerized applications, a disaster recovery plan, and a disaster recovery policy, with each containerized application having a consistency level. The method comprises controlling replication of the application consistency group from the system to a disaster recovery storage system according to the disaster recovery policy, the disaster recovery plan, and the consistency levels.

In a first implementation form of the method of disaster recovery according to the third aspect as such, the disaster recovery policy defines the consistency levels for the containerized applications, with the consistency levels selectable from a crash consistency to an end-to-end application consistency.

In a second implementation form of the method of disaster recovery according to the third aspect as such or any preceding implementation form of the third aspect, the disaster recovery policy defines one or more of a recovery time objective, a recovery point objective, or a storage type for the disaster recovery storage system.

In a third implementation form of the method of disaster recovery according to the third aspect as such or any preceding implementation form of the third aspect, the disaster recovery plan defines characteristics or operations of the containerized applications.

In a fourth implementation form of the method of disaster recovery according to the third aspect as such or any preceding implementation form of the third aspect, the containerized applications include a stateful containerized application and a stateless containerized application.

In a fifth implementation form of the method of disaster recovery according to the third aspect as such or any preceding implementation form of the third aspect, the method includes driving the replication of the application consistency group to the disaster recovery storage system based on action by the system, action by an orchestrator, or time.

In a sixth implementation form of the method of disaster recovery according to the third aspect as such or any preceding implementation form of the third aspect, the method includes using the disaster recovery policy to select use of synchronous replication or asynchronous replication.

In a seventh implementation form of the method of disaster recovery according to the third aspect as such or any preceding implementation form of the third aspect, the method includes making a dynamic change to the disaster recovery policy or the disaster recovery plan, using one or more processors of the system.

In an eighth implementation form of the method of disaster recovery according to the third aspect as such or any preceding implementation form of the third aspect, the method includes controlling a behaviour of the disaster recovery storage system using the system or an orchestrator for the system.

In a ninth implementation form of the method of disaster recovery according to the third aspect as such or any preceding implementation form of the third aspect, the method includes generating the application consistency group with at least portions of the application consistency group being user-definable.

According to a fourth aspect of the present disclosure, there is provided a non-transitory computer-readable medium storing instructions for disaster recovery, which, when executed by one or more processors, cause the one or more processors to perform operations. The operations comprise generating an application consistency group in a system, with the application consistency group including containerized applications, a disaster recovery plan, and a disaster recovery policy, with each containerized application having a consistency level. The operations comprise controlling replication of the application consistency group from the system to a disaster recovery storage system according to the disaster recovery policy, the disaster recovery plan, and the consistency levels.

In a first implementation form of the non-transitory computer-readable medium according to the fourth aspect as such, the disaster recovery policy defines the consistency levels for the containerized applications, with the consistency levels selectable from a crash consistency to an end-to-end application consistency.

In a second implementation form of the non-transitory computer-readable medium according to the fourth aspect as such or any preceding implementation form of the fourth aspect, the disaster recovery policy defines one or more of a recovery time objective, a recovery point objective, or a storage type for the disaster recovery storage system.

In a third implementation form of the non-transitory computer-readable medium according to the fourth aspect as such or any preceding implementation form of the fourth aspect, the disaster recovery plan defines characteristics or operations of the containerized applications.

In a fourth implementation form of the non-transitory computer-readable medium according to the fourth aspect as such or any preceding implementation form of the fourth aspect, the containerized applications include a stateful containerized application and a stateless containerized application.

In a fifth implementation form of the non-transitory computer-readable medium according to the fourth aspect as such or any preceding implementation form of the fourth aspect, the operations include driving the replication of the application consistency group to the disaster recovery storage system based on action by the system, action by an orchestrator, or time.

In a sixth implementation form of the non-transitory computer-readable medium according to the fourth aspect as such or any preceding implementation form of the fourth aspect, the operations include using the disaster recovery policy to select use of synchronous replication or asynchronous replication.

In a seventh implementation form of the non-transitory computer-readable medium according to the fourth aspect as such or any preceding implementation form of the fourth aspect, the operations include making a dynamic change to the disaster recovery policy or the disaster recovery plan, using one or more processors of the system.

In an eighth implementation form of the non-transitory computer-readable medium according to the fourth aspect as such or any preceding implementation form of the fourth aspect, the operations include controlling a behaviour of the disaster recovery storage system using the system or an orchestrator for the system.

In a ninth implementation form of the non-transitory computer-readable medium according to the fourth aspect as such or any preceding implementation form of the fourth aspect, the operations include generating the application consistency group with at least portions of the application consistency group being user-definable.

According to a fifth aspect of the present disclosure, there is provided a method of disaster recovery. The method comprises receiving, in a disaster recovery storage system, a replication of an application consistency group from a storage system, where the application consistency group includes containerized applications, a disaster recovery plan, and a disaster recovery policy, with each containerized application having a consistency level. The method also comprises updating, in the disaster recovery storage system, the received replication of the application consistency group with changes from the storage system in accordance with the disaster recovery plan or the disaster recovery policy, and returning a disaster recovery status to the storage system in response to the update.

In a first implementation form of the method according to the fifth aspect as such, the method includes providing the updated received replication of the application consistency group to the storage system in response to receiving a callback from the storage system or an orchestrator to the storage system.

In a second implementation form of the method according to the fifth aspect as such or any preceding implementation form of the fifth aspect, the method includes adjusting a behaviour of the disaster recovery storage system based on control from the storage system or an orchestrator to the storage system.

According to a sixth aspect of the present disclosure, there is provided a non-transitory computer-readable medium storing instructions, which, when executed by one or more processors, cause the one or more processors to perform operations. The operations comprise receiving, in a disaster recovery storage system, a replication of an application consistency group from a storage system, where the application consistency group includes containerized applications, a disaster recovery plan, and a disaster recovery policy, with each containerized application having a consistency level. The operations also include updating, in the disaster recovery storage system, the received replication of the application consistency group with changes from the storage system in accordance with the disaster recovery plan or the disaster recovery policy, and returning a disaster recovery status to the storage system in response to the update.

In a first implementation form of the non-transitory computer-readable medium according to the sixth aspect as such, the operations include providing the updated received replication of the application consistency group to the storage system in response to receiving a callback from the storage system or an orchestrator to the storage system.

In a second implementation form of the non-transitory computer-readable medium according to the sixth aspect as such or any preceding implementation form of the sixth aspect, the operations include adjusting a behaviour of the disaster recovery storage system based on control from the storage system or an orchestrator to the storage system.

According to a seventh aspect of the present disclosure, there is provided a system comprising a memory storing instructions and one or more processors in communication with the memory, wherein the one or more processors execute the instructions. The one or more processors execute the instructions to operate as one or more pseudo application programming interfaces to generate or adjust an application consistency group in the system, with the application consistency group including containerized applications, a disaster recovery plan, and a disaster recovery policy, with each containerized application having a consistency level.

In a first implementation form of the system according to the seventh aspect as such, the one or more pseudo application programming interfaces include a create application consistency group pseudo application programming interface, a delete application consistency group pseudo application programming interface, and a register a component pseudo application programming interface.

In a second implementation form of the system according to the seventh aspect as such or any preceding implementation form of the seventh aspect, the one or more pseudo application programming interfaces include, directed to all components in a specified application consistency group, a freeze all pseudo application programming interface having an argument including the specified application consistency group, and an unfreeze all pseudo application programming interface having an argument including the specified application consistency group.

In a third implementation form of the system according to the seventh aspect as such or any preceding implementation form of the seventh aspect, the one or more pseudo application programming interfaces include, based on user input, a create policy pseudo application programming interface, a delete policy pseudo application programming interface, and a modify pseudo application programming interface.

In a fourth implementation form of the system according to the seventh aspect as such or any preceding implementation form of the seventh aspect, the one or more pseudo application programming interfaces include a next cycle policy pseudo application programming interface to start or end a replication cycle for the application consistency group.

In a fifth implementation form of the system according to the seventh aspect as such or any preceding implementation form of the seventh aspect, the one or more pseudo application programming interfaces include a stop all pseudo application programming interface to provide for all components in a specified application consistency group to gracefully enter a pause state and prepare for changes to the specified application consistency group.

In a sixth implementation form of the system according to the seventh aspect as such or any preceding implementation form of the seventh aspect, the one or more pseudo application programming interfaces include a restart all pseudo application programming interface to provide for all components in a specified application consistency group to start to function normally from a pause state.

Any one of the foregoing examples may be combined with any one or more of the other foregoing examples to create a new embodiment in accordance with the present disclosure.

BRIEF DESCRIPTION OF THE DRAWINGS

The drawings illustrate generally, by way of example, but not by way of limitation, various embodiments discussed in the present document.

FIG. 4 is a flow diagram of features of an example method of disaster recovery, according to various embodiments.

FIG. 5 is a flow diagram of an example method of disaster recovery, according to various embodiments.

DETAILED DESCRIPTION

Figure 1:
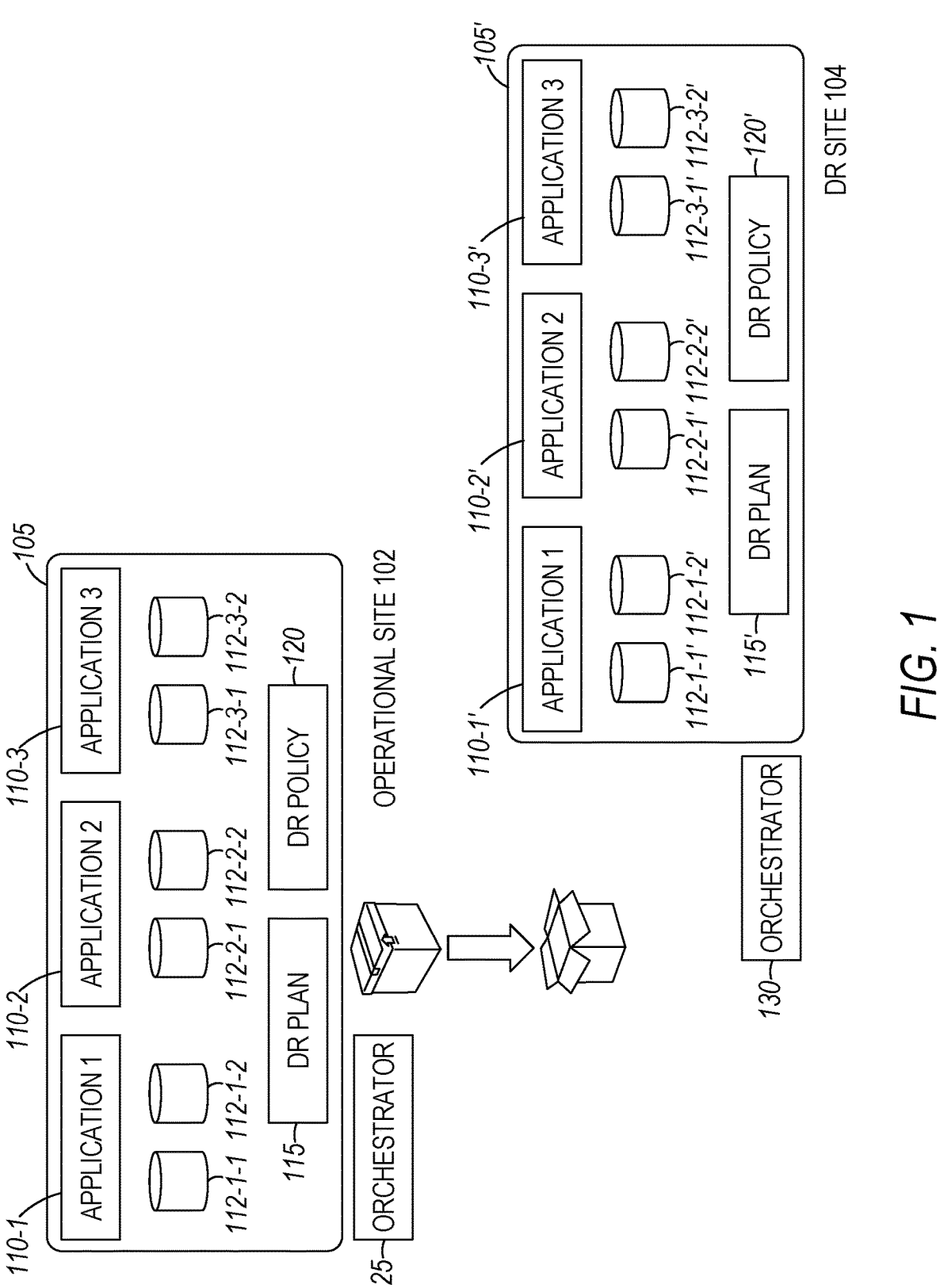
FIG. 1 illustrates an example of operational components for an application-consistent disaster recovery for container-based applications, according to various embodiments.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized, and that structural, logical, mechanical, and electrical changes may be made. The following description of example embodiments is, therefore, not to be taken in a limited sense.

The functions or algorithms described herein may be implemented in software in an embodiment. The software may comprise computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), a microprocessor, or other type of processor operating on a computer system, such as a personal computer, server, or other computer system, turning such computer system into a specifically programmed machine.

Computer-readable non-transitory media include all types of computer readable media, including magnetic storage media, optical storage media, and solid state storage media and specifically excludes signals. It should be understood that the software can be installed in and sold with the devices that implement arrangements of compute clusters and storage clusters for artificial intelligence training as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

Many mission critical applications are stateful. However, due to their inflexibility, backup or disaster recovery (DR) of container-based stateful applications can have problems to be solved before enterprises can move virtual machine (VM)-based deployment to container-based deployment, even though a container-based deployment provides many benefits. Stateful applications are often deployed via a "statefulset" controller. In this controller, a set of persistent volume claims can be defined and corresponding persistent volumes will be provisioned. A persistent volume (PV) is an amount of physical storage that has been provisioned, for example, by an administrator. A persistent volume claim (PVC) is a request for storage by a user. Claims can request specific size and access modes with respect to reading and writing to the storage. However, conventional container-based approaches lack of a method to provide secure backup and DR for container-based application. Some approaches include a combination of management of containerized applications and storage capabilities. This issue is particularly challenging if the persistent data size is large.

Associated with container-based application is the state of data consistency. In the context of data protection there are currently two types or states of data consistency: crash consistency and application consistency. Consistency can be viewed in terms of snapshots or backups of the data considered for protection. A backup or snapshot is crash consistent if all of the interrelated data components of the backup or snapshot are as they were (write-order consistent) at the instant of the crash with respect to the data. To better understand this type of consistency, consider the status of the data on a personal computer's (PC's) hard drive after a power outage or similar event. A crash-consistent backup is usually sufficient for non-database operating systems and applications like file servers, dynamic host configuration protocol (DHCP) servers, print servers, and other devices.

A backup or snapshot is application consistent if, in addition to being write-order consistent, current running applications complete all their operations and store associated data in persistent storage. For example, a running application can flush (store) their buffers to disk such as in application quiescing. Application-consistent backups are typically recommended for database operating systems and applications such as structured query language (SQL) and others.

In various embodiments, consistency in backup, DR, and mobility for container-based applications can be provided via a herein defined "application consistency group." An application consistency group that is DR capable includes application states of multiple applications, a DR policy, and a DR plan in a single group. The application consistency group can include configuration details and PVs. A DR policy of an application consistency group defines features for storage conversion with respect to an operational site and a DR site for the application consistency group. A DR policy of an application consistency group can define recover point objective (RPO), recovery time objective (RTO), storage type, consistency type, and other features for disaster recovery for data storage for the application consistency group. RPO can refer to the amount of data that can be lost within a relevant period, before significant harm occurs, from the point of a critical event to the most preceding backup. RTO can refer to the quantity of time that an application, system and/or process, can be down (non-operational) without causing significant damage to the respective entity as well as the time spent restoring the application and its data. The RPO deals with data loss as a parameter for a backup strategy, while RTO deals with time to recover as a parameter for a disaster recovery strategy.

A DR plan can define how to implement one or more elements of a DR policy and can be viewed as a recipe or cookbook for disaster recovery for data storage. A DR policy of an application consistency group can define characteristics of the disaster recovery between an operational site and a recovery site for the application consistency group. A DR plan of an application consistency group can define data location such as but not limited to image location and operations of the recovery procedures, which may be considered a playbook by which the recovery procedures are undertaken. A holistic control approach to coordinate storage replication and applications can be implemented to achieve different consistency levels for application consistency groups. A set of pseudo application programming interfaces (pseudo-APIs) can be based on and implemented for use with application consistency groups. An API is an a shared boundary for which two or more separate components of a system exchange information, where the information defines interactions between the two or more separate components, the API can include multiple software applications or mixed hardware-software intermediaries. A pseudo-API is a set of executable instructions that can behave similar or identical to an API.

FIG. 1 illustrates an embodiment of an example of operational components for an application-consistent disaster recovery for container-based applications. FIG. 1 shows an application consistency group 105 that is packaged at an operational site 102 and transmitted to a DR site 104 where application consistency group 105' is unpackaged. Application consistency group 105' can be provided as a replication of application consistency group 105. Application consistency group 105 includes application states of multiple applications 110-1, 110-2, and 110-3, configuration details of these applications, DR plan 115, DR policy 120, PV 112-1-1 and PV 112-1-2 for application 110-1, PV 112-2-1 and PV 112-2-2 for application 110-2, and PV 112-3-1 and PV 112-3-2 for application 110-3. Though there are shown a number of applications and PVs, application consistency group 105 can include more or less than three containerized applications and more or less than two PVs independently for each independent application. In addition to application consistency group 105 being capable of having multiple applications, the multiple applications of application consistency group 105 can include stateful applications and stateless applications grouped together in consistency group 105. Application consistency group 105 can include a consistency state for each application of the multiple applications in application consistency group 105.

The whole workflow for an application-consistent disaster recovery can be combined with a storage system's capability of replication, but can also be shipped separately by an orchestrator component. A storage system's capability of replication can be realized by instructions stored in a memory device and executed by one or more processors. A storage system typically includes multiple storage nodes, where each storage node has memory and storage processors. The storage processors operate as storage controllers having main tasks to store, retrieve, and protect data. The storage system can also contain storage structures that are either external to storage nodes or are a part of storage nodes, where such storage structure can include enclosures of disk drives. Each storage node can control storage of objects on these drives. Additionally, each storage node can control certain portion of storage, and data can be managed by the storage nodes to store, delete, access, copy, or perform other actions on the data.

In the example of FIG. 1, an orchestrator 125 at operational site 102 can wrap up the whole application consistency group 105 into a "package" and relocate application consistency group 105 for backup, DR, or mobility purpose. At DR site 104, an orchestrator 130 can unpackage application consistency group 105 as replication application consistency group 105' for storage at DR site 104. If an event occurs in which a trusted version of one or more of the components of application consistency group 105 is to be recaptured at operational site 102, the replication application consistency group 105' or parts thereof can be packaged by orchestrator 130 at DR site 102 and relocated back to operational site 104. The relocation back can be in response to a recall request.

Container orchestration can involve automation of all aspects of coordinating and managing containers and can be focused on managing the life cycle of containers and their dynamic environments. There are a number of tasks that can be automated via container orchestration. An orchestrator can configure and schedule of containers, provision and deploy containers, and manage availability of containers. An orchestrator can control configuration of applications in terms of the containers in which these applications run and can control scaling of containers to equally balance application workloads across an infrastructure. An orchestrator can manage allocation of resources between containers, manage load balancing, traffic routing and service discovery of containers, manage health monitoring of containers, and manage security of interactions between containers. An orchestrator can be implemented via instructions stored in a memory device and executed by one or more processors.

Figure 2:
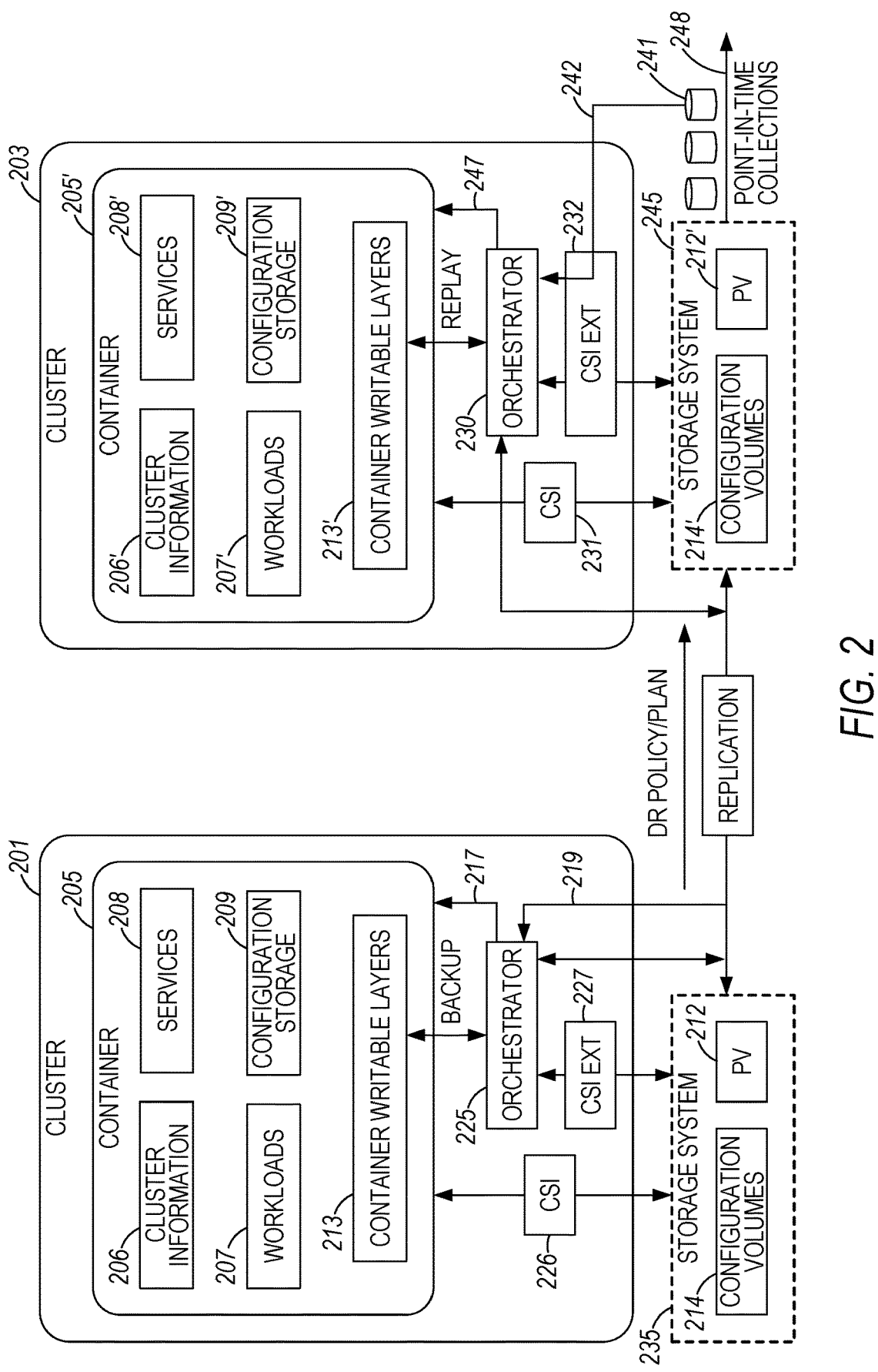
FIG. 2 is a block diagram showing features of an example recovery procedure between a storage system at an operational site for data storage and a storage system at a disaster recovery site, according to various embodiments.

FIG. 2 is a block diagram showing features of an embodiment of an example recovery procedure between a storage system 235 at an operational site for data storage and a storage system 245 at a DR site. With respect to the operational site, the storage system 235 can include configuration volumes 214 and PVs 212. Storage system 235 can provide a cluster 201 for one or more application consistency groups, though one application consistency group 205 is shown, where the application consistency group 205 can be implemented as a container. Cluster 201 is an example of a hosting environment that provides a platform for the application consistency groups. The cluster 201 has at least one set of machines that run containerized applications.

Application consistency group 205 can contain multiple applications, as illustrated by application consistency group 105 shown in FIG. 1. The multiple applications can include both stateless applications and stateful applications. In addition, application consistency group 205 can include a consistency level for each of the applications. Details for the applications of application consistency group 205 can include cluster information 206, workloads 207, services 208, and configuration storage 209. In the modular architecture of FIG. 2, associated with the application consistency group 205 is an orchestrator 225, which can be implemented with functionality as discussed above. Orchestrator 225 can be implemented to perform backup with respect to application consistency group 205 via container writable layers 213 to track a state of application consistency group 205 or one or more applications within application consistency group 205. Backup operations can include data and configurations. Orchestrator 225 can operate to assist in capturing run-time changes introduced application consistency group 205 or applications within application consistency group 205. Orchestrator 225 can operate to assist restore operations such as but not limited to disaster recovery.

A container storage interface (CSI) 225 can provide an interface to storage system 235 for application consistency group 205, which interface supports the creation and configuration of persistent storage external to orchestrator 225, input/output (I/O) of orchestrator 225, and advanced functionality of orchestrator 225, such as but not limited to snapshots and cloning. An extra (or extension) container storage interface (CSI EXT) 227 can be implemented to interface orchestrator 225 with the storage system 235.

Storage system 245 can be implemented at a DR site in a manner similar to storage system 235. With respect to the DR site, the storage system 235 can include configuration volumes 214' and PVs 212'. Storage system 235 can provide a cluster 202 for one or more application consistency groups, though one application consistency group 205' is shown, where the application consistency group 205 can be implemented as a container. Cluster 203 is an example of a hosting environment that provides a platform for the application consistency groups. The cluster 203 has at least one set of machines that run containerized applications.

Application consistency group 205' can contain multiple applications, as illustrated by application consistency group 105 shown in FIG. 1. The multiple applications can include both stateless applications and stateful applications. In addition, application consistency group 205' can include a consistency level for each of the applications. Details for the applications of application consistency group 205' can include cluster information 206', workloads 207', services 208', and configuration storage 209'.

In the modular architecture of FIG. 2, associated with the application consistency group 205' is an orchestrator 230, which can be implemented with functionality as discussed above. Orchestrator 230 can be implemented in performance of backup operations with respect to application consistency group 205' via container writable layers 213' to track a state of application consistency group 205' or one or more applications within application consistency group 205'. Such backup operations can include data and configurations. Orchestrator 230 can operate to assist in capturing run-time changes introduced to application consistency group 205' or applications within application consistency group 205'. Optionally, a control signal 247 can be provided by orchestrator 230 to restart one or more of the applications of the application consistency group 205'. Orchestrator 230 can operate to assist restore operations such as but not limited to disaster recovery.

A CSI 231 can provide an interface to storage system 245 for application consistency group 205', which interface supports the creation and configuration of persistent storage external to an orchestrator 230, input/output (I/O) of orchestrator 230, and advanced functionality of orchestrator 230, such as but not limited to snapshots and cloning. A CSI EXT 232 can be implemented to interface orchestrator 230 with the storage system 245. Storage devices 241 that contain point-in-time collections of data and associated information can provide specified data and associated information to orchestrator 230 via CSI EXT 232 directly via connection 242.

In a procedure that allows for disaster recovery, application consistency group 205' at the DR site can be generated and updated in a replication process with application consistency group 205 at the operational site. The replication can be conducted in accordance with the DR policy and the DR plan that is part of the application consistency group 205 and becomes part of the application consistency group 205'. The replication can be performed at the storage level or at the orchestrator level, providing an integrated control path for application consistency group 205 and replication. Storage system 235 can execute a generation of a communication signal 219 with orchestrator 225 that is an in-band communication or an out-of-band communication.

In a procedure that allows for disaster recovery, application consistency group 205' at the DR site can be generated and updated in a replication process with application consistency group 205 at the operational site. The replication can be conducted in accordance with the DR policy and the DR plan that is part of the application consistency group 205 and becomes part of the application consistency group 205'. In the backup process for replication, orchestrator 225 can execute a generation 217 of a freeze pseudo-API to application consistency group 205. The function of the freeze pseudo-API depends on the consistency levels of the applications in application consistency group 205. The nature of the freeze operations can be related to consistency levels such as but not limited to different levels of consistency from crash consistency to end-to-end application consistency. For an application in the application consistency group 205 that has an application consistency characteristic, all components associated with this application are frozen or stopped to acquire the data and associated information for replication. For an application in the application consistency group 205 that has a crash consistency characteristic, data and associated information for replication can be taken without a freeze operation.

Application consistency group 205 can be implemented as a DR-capable application consistency group for both synchronous replication and asynchronous replication. In synchronous replication, data can be written to primary storage system 235 for an application in application consistency group 205 and for the replica application in application consistency group 205' to storage system 245 simultaneously. In an active-passive synchronous replication, the replica site writes when the originator side writes in response to a specified event, while in the absence of the specified event the replica site is passive and does not engage in a write operation. In an active-active synchronous replication, the replica site writes when the originator side writes without a correlation to a specified event. In asynchronous replication, data can be copied to the replica application in application consistency group 205' in storage system 245 after the data has been written to primary storage system 235 for an application in application consistency group 205.

Implementation of DR-capable application consistency groups can provide a holistic control path for application-to-storage replication to effectively implement a "continuous DR." Such a continuous DR can be realized by, but not limited to, continuously checking status of an application consistency group on a time basis, a storage cycle basis, a orchestrator cycle basis. This implementation can be used to shorten RTO. In addition, the DR policy or the DR plan can be dynamically changed and replicated to the DR site during a cycle of operation.

DR-capable application consistency group 205 can enter into a disaster recovery ready with replication to application consistency group 205' at the DR site according to the DR policy of application consistency group 205. The DR policy of application consistency group 205 can provide for defining conversion of application consistency group 205. This DR policy can define a RPO, a RTO, a type of storage to be used, and a consistency level for each application of application consistency group 205, among other features. The DR plan of application consistency group 205 can define the characteristics of the replication, including location of an image of application consistency group 205 being replicated and operations for performing replication and retrieval of the components of application consistency group 205. The source side, which can be considered the originating side, can control the behavior of the DR site in replication and recovery. For example, storage system 235 or orchestrator 225 can initiate and control details for storage replication callback and selection of criteria for time-based synchronization.

Figure 3:
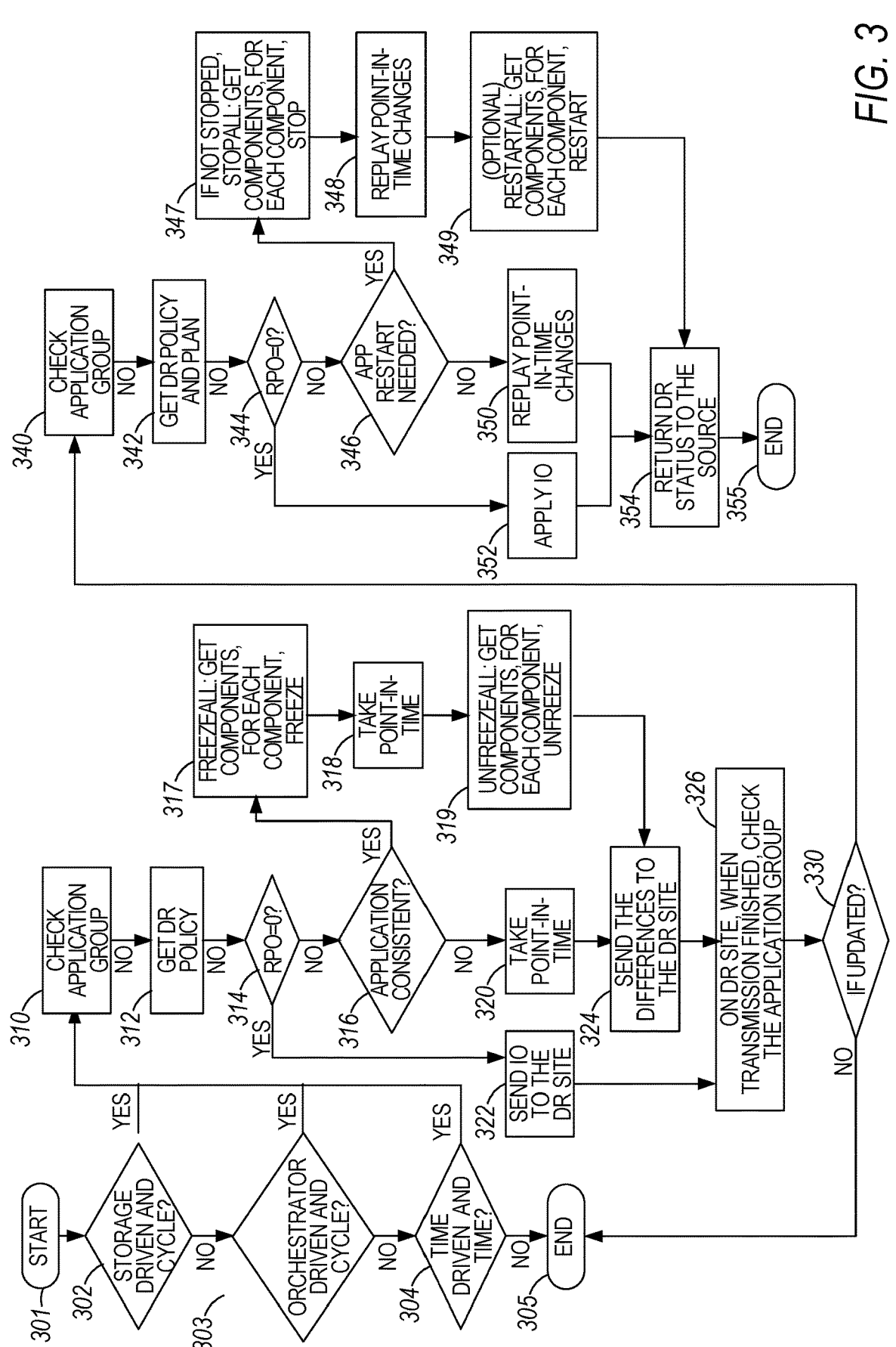
FIG. 3 illustrates features of an example operational flow showing end-to-end control flow from storage to replication for disaster recovery readiness, according to various embodiments.

FIG. 3 illustrates features of an embodiment of an example operational flow 300 showing end-to-end control flow from storage to replication for disaster recovery readiness. The control flow can be performed in cycles, which can be driven by a storage system, an orchestrator, or time. Non-limiting examples of a controlling storage system can include storage system 235 of FIG. 2. Non-limiting examples of a controlling orchestrator can be orchestrator 125 of FIG. 1 or orchestrator 225 of FIG. 2. A change on the source side (originating side) during a cycle can be effectuated on the target side (DR site) in the next cycle.

Operational flow 300 can be viewed as three sets of operations. In the first set of operations, a determination is made as to identification of the source driving the tracking for replication of an application consistency group such as application consistency group 105 of FIG. 1 or application consistency group 205 of FIG. 2. In the second set of operations, replication and transmission to the DR site can be conducted based on consistency of applications in the application consistency group. In the third set of operations, replication in the target side can be made and a DR status returned to the source side.

At operation 301, the replication process for disaster recovery can be started. Starting operation 301 can be for initiation of the disaster recovery procedure or for the beginning of a cycle for application consistency group backup. Operation 302 determines whether the controlling cycle is storage system driven and the current cycle. If operation 302 determines that the cycle is storage system driven, the procedure moves to operation 310 to check the application consistency group. If the result of operation 302 is that the cycle is not storage system driven, operation 303 is conducted to determine whether the controlling cycle is orchestration driven and the current cycle. If operation 303 determines that the cycle is orchestration system driven, the procedure moves to operation 310 to check the application consistency group. If the result of operation 303 is that the cycle is not orchestration driven, operation 304 is conducted to determine whether the controlling cycle is time driven and the current time. If operation 304 determines that the cycle is time driven, the procedure moves to operation 310 to check the application consistency group. If the result of operation 303 is that the cycle is not orchestration driven, then the replication process is not cycle driven and the process proceeds to an end at operation 305. The order of the determination of the basis for a cycle can be changed. A replication process not being cycle driven can be an error and error processing can be executed.

After determination of use of a cyclic procedure and cycle basis for storage to replication processing for disaster recovery readiness, the second set of operations can begin with checking the application consistency group at operation 310. For the application consistency group being processed, the DR policy is obtained from the application consistency group at operation 312. At operation 314, a determination is made as to whether the RPO for the application consistency group has been reached. If the RPO has been reached, output is sent to the DR site at operation 322. If the RPO has been reached, operations can be conducted for each application in the application consistency group. At operation 316, a determination is made as to whether each application of the application consistency group has application consistency. At operation 320, for those applications of the application consistency group that do not have application consistency, collection of the data of the application and its associated information, such as but not limited to configuration information, is made at the current point-in-time. The collected data and information can be compared to data and information from the last cycle. At operation 324 for applications without application consistency, differences in data and information between the data and information taken at the current point-in-time and the data and information taken at the last point-in-time for collection is sent to the DR site. Alternatively, the data and information taken at the current point-in-time can be sent to the DR site with or without comparison with the last point-in-time collection. The transmission to the DR site can be performed after all the applications of the application consistency group have been checked and processed.

At operation 317, for those applications of the application consistency group that have application consistency, for each application having application consistency, the operations of these applications are frozen. An application can be frozen when it is precluded from further processing. Current operations may be completed, depending on the details of such operations. The freeze is extended to components associated with the applications being frozen. At 318, after freezing those applications of the application consistency group that have application consistency, collection of the data of the application and its associated information, such as but not limited to configuration information, is made at the current point-in-time. After collection of the data and information at the current point-in-time, the frozen application and associated components are allowed to continue operation, which can be viewed as unfreezing these instrumentalities. The collected data and information for the applications with application consistency can be compared to data and information from the last cycle for these applications. At operation 324 for applications with application consistency, differences in data and information between the data and information taken at the current point-in-time and the data and information taken at the last point-in-time for collection is sent to the DR site. Alternatively, the data and information taken at the current point-in-time can be sent to the DR site with or without comparison with the last point-in-time collection. The transmission to the DR site can be performed after all the applications of the application consistency group have been checked and processed. The transmission to the DR site, for example at operation 324, can be transmission of the application consistency group with all applications and associated components checked and processed, either as a transmission of differences or a transmission of the complete application consistency group.

At operation 326 on the DR site, when the transmission from the source side has finished whether by operation 322 after the RPO determination or by operation 324 for applications of the application consistency group with and without application, the application consistency group is checked. At operation 330, a determination is made as to whether the application consistency group was updated. If there are no changes, the application consistency group has not been updated and the control flow from storage to replication for disaster recovery readiness ends at operation 305. For cyclic processing, the control flow from storage to replication for disaster recovery readiness can start again with the occurrence of the next cycle.

After determination at operation 330 that the application consistency group was updated, the third set of operations can begin with checking the application consistency group at the DR site at operation 340. For the application consistency group received at the DR site, the DR policy is obtained from the received application consistency group at operation 342. At operation 344, a determination is made as to whether the RPO for the received application consistency group has been reached. If the RPO has been reached, input from the received application consistency group is applied at the DR site at operation 352. If the RPO has been reached, operations can be conducted for each application in the application consistency group. At operation 346, for each application of the application consistency group, a determination is made as to whether to restart the given application. At operation 350, for those applications that are not restarted, current received point-in-time changes, received in the application consistency group are replayed. The changes can be the differences determined at the source side or the complete updated application consistency group transmitted to the DR site.

At operation 347, for those applications of the application consistency group that are restarted at operation 346, the operations of these applications are stopped. An application can be stopped when it is precluded from further processing. Current operations may be completed, depending on the details of such operations and the consistency level of the given application. The stop is extended to components associated with the applications being stopped. At operation 348, after stopping those applications of the application consistency group that are to be restarted currently received point-in-time changes are replayed. Optionally, components of all applications, including each application, determined to be restarted can all be restarted, such that the restart is not limited to changes.

At operation 354 on the DR site, after application consistency group has been applied at the DR site at operation 352, point-in-time changes have been replayed at operation 350 or operation 346, or restart of all components at operation 324, a DR status can be returned from the DR site to the source side. After transmission of the DR status to the source side the control flow from storage to replication for disaster recovery readiness ends at operation 355. For cyclic processing, the control flow from storage to replication for disaster recovery readiness can start again with the occurrence of the next cycle.

Pseudo-APIs, based on application consistency group, can be implemented for the operation of the architectures associated with FIGS. 1 and 2 and the control flow of FIG. 3. Pseudo-APIs can include, but are not limited to, sets of pseudo-APIs such as a set including create AppGroup( ), deleteAppGroup( ), and registerComponent( ), a set including freezeAll ( ), unfreezeAll( ), stopAll( ), and restartAll( ), a set including createPolicy( ), deletePolicy( ), and modifyPolicy( ), and a set including nextCycle( ). The createAppGroup( ) pseudo-API can be used to create an application consistency group. The arguments for this pseudo-API can include a name or some form of identification of the application consistency group. The createAppGroup( ) pseudo-API can assign applications to the created application consistency group along with information associated with the assigned applications, such as but not limited to configuration information or associated PVs. An existing application consistency group can be removed from status as an application consistency group using the deleteAppGroup( ) pseudo-API, whose argument identifies the application consistency group to be dissolved as an application consistency group. New components for an application in an application consistency group can be added using the registerComponent( ) pseudo-API, whose argument identifies the application consistency group to which the components are being added.

The freezeAll( ) pseudo-API, having the name or some identification of a specific application consistency group as an argument, instructs all the applications included in the specific application consistency group to transition to a proper checkpoint. The checkpoint is application specific and decided by the DR requirements of the application. An non-limiting example of the checkpoint is the flushing of all needed data to persistent storage. The freezeAll( ) pseudo-API can be invoked by an orchestrator instructing components in the application consistency group to freeze. Components can include pods, PVs, PVCs, DR plan, DR policy, applications, and other features associated with the applications. All subcomponents within the specific application consistency group also implement the freezeAll( ) interface. The freezeAll( ) pseudo-API will return once all the applications in the specific application consistency group reach proper checkpoints. The unfreezeAll( ) pseudo API, having the name or some identification of a specific application consistency group as an argument, instructs all the applications included in the specific application consistency group that the applications do not have to stay in the checkpoint state. The orchestrator can call the components to unfreeze. All subcomponents implement the unfreeze( ) interface.

The stopAll( ) pseudo API, having the name or some identification of a specific application consistency group as an argument, instructs all applications of the specific application consistency group to hold in a state in which the applications will be refreshed by the persistent state. All components in the specific application group gracefully enter a pause state that allows them to be ready for changes. When the applications are unstopped, the applications can resume running and fetching the latest states from the persistent storage. The restartAll( ) pseudo API, having the name or some identification of a specific application consistency group as an argument, instructs all components in specific application consistency group start to function normally. The restartAll( ) pseudo API can be implemented as an unstopAll( ) pseudo API, having the name or some identification of a specific application consistency group as an argument, that tells all the application included in the specific application consistency group that they do not have to stay in the stopped state.

The createPolicy( ) pseudo API, having the name or some identification of a specific application consistency group as an argument, provides a mechanism to create a DR policy for the specific application consistency group. The creation of the DR policy can be based on user input. The DR policy for the specific application consistency group can removed from the specific application consistency group using the deletePolicy( ) pseudo API, having the name or some identification of a specific application consistency group as an argument. In addition, features of the specific application consistency group can be modify, based on user input, using the modifyPolicy( ). The modifications can include additions, removal, or alterations of identified features of the specific application consistency group.

A pseudo API can be implemented for an end-to-end control flow from storage to replication for disaster recovery readiness conducted as a cyclic process that defines the start, end, or variations thereof. The nextCycle( ) pseudo API, having the name or some identification of a specific application consistency group as an argument along with a start or end identification, provides a mechanism to control the cycle for the storage to replication process. The initiator (or caller) of the nextCycle( ) pseudo API can be an orchestrator or a storage system, depending on whether the cycle is initiated by the orchestrator or by the storage system. In various embodiments, orchestrator—storage system communication can be conducted through a new CSI interface constructed for implementation with an architecture having one or more clusters of application consistency groups. The orchestrator—storage system communication can also be conducted through an out-of-band API.

FIG. 4 is a flow diagram of features of an embodiment of an example method 400 of disaster recovery. Method 400 can be implemented using a processing module having one or more processors that executes instructions, which instructions are stored in a memory device or memory system, to perform operations with respect to a system. The one or more processors can be arranged as storage processors for a storage system. At operation 410, an application consistency group is generated in a system, with the application consistency group including containerized applications, a disaster recovery plan, and a disaster recovery policy. Each containerized application has a consistency level. The containerized applications can include a stateful containerized application and a stateless containerized application. The disaster recovery policy can define the consistency levels for the containerized applications, with the consistency levels being selectable from a crash consistency to an end-to-end application consistency. The disaster recovery policy can define one or more of a recovery time objective, a recovery point objective, or a storage type for the disaster recovery storage system. The disaster recovery plan can define characteristics or operations of the containerized applications.

At operation 420, replication of the application consistency group from the system to a disaster recovery storage system is controlled according to the disaster recovery policy, the disaster recovery plan, and the consistency levels of the application consistency group.

Variations of method 400 or methods similar to the method 400 can include a number of different embodiments that may be combined depending on the application of such methods and/or the architecture of devices or systems in which such methods are implemented. Such methods can include driving the replication of the application consistency group to the disaster recovery storage system based on action by the system, action by an orchestrator, or time. Variations can include controlling a behaviour of the disaster recovery storage system using the system or an orchestrator for the system.

Variations of method 400 or methods similar to the method 400 can include using the disaster recovery policy to select use of synchronous replication or asynchronous replication. Variations can include making a dynamic change to the disaster recovery policy or the disaster recovery plan, using one or more processors of the system. Variations can include generating the application consistency group with at least portions of the application consistency group being user-definable.

In various embodiments, a non-transitory machine-readable storage device, such as computer-readable non-transitory medium, can comprise instructions stored thereon, which, when performed by a machine, cause the machine to perform operations, where the operations comprise one or more features similar to or identical to features of methods and techniques described with respect to method 400, variations thereof, and/or features of other methods taught herein such as associated with FIGS. 1-6. The physical structures of such instructions may be operated on by one or more processors. For example, executing these physical structures can cause the machine to perform operations comprising generating an application consistency group in a system, with the application consistency group including containerized applications, a disaster recovery plan, and a disaster recovery policy, with each containerized application having a consistency level; and controlling replication of the application consistency group from the system to a disaster recovery storage system according to the disaster recovery policy, the disaster recovery plan, and the consistency levels. The application consistency group can be generated with at least portions of the application consistency group being user-definable.

Operations can include the disaster recovery policy defining the consistency levels for the containerized applications, with the consistency levels selectable from a crash consistency to an end-to-end application consistency. Operations can include the disaster recovery policy defining one or more of a recovery time objective, a recovery point objective, or a storage type for the disaster recovery storage system. Operations can include using the disaster recovery policy to select use of synchronous replication or asynchronous replication. Operations can include the disaster recovery plan defining characteristics or operations of the containerized applications. The containerized applications can include a stateful containerized application and a stateless containerized application.

Operations can include driving the replication of the application consistency group to the disaster recovery storage system based on action by the system, action by an orchestrator, or time. Operations can include controlling a behaviour of the disaster recovery storage system using the system or an orchestrator for the system. Operations can include making a dynamic change to the disaster recovery policy or the disaster recovery plan, using one or more processors of the system.

In various embodiments, a system can comprise a memory storing instructions and one or more processors in communication with the memory, where the one or more processors execute the instructions. The one or more processors can be implemented as one or more storage processors with the system including a storage system. The instructions include instructions to generate an application consistency group in the system, with the application consistency group including containerized applications, a disaster recovery plan, and a disaster recovery policy, with each containerized application having a consistency level; and control a replication of the application consistency group from the system to a disaster recovery storage system according to the disaster recovery policy, the disaster recovery plan, and the consistency levels. At least portions of the application consistency group can be user-definable or based on user input.

The disaster recovery policy can define the consistency levels for the containerized applications, with the consistency levels selectable from a crash consistency to an end-to-end application consistency or variations thereof. The disaster recovery policy can define one or more of a recovery time objective, a recovery point objective, a storage type for the disaster recovery storage system, or other feature for the disaster recovery storage system or disaster recovery process. The disaster recovery plan can define characteristics or operations of the containerized applications. The application consistency group can include different types of containerized applications. The containerized applications of the application consistency group include one or more stateful containerized applications and one or more stateless containerized applications. In some instances, an application consistency group can include only stateful containerized applications depending on the circumstances for storage of the multiple applications. In some instances, an application consistency group can include only stateless containerized applications, depending on the circumstances for storage of the multiple applications.

Variations of such a system or similar systems can include a number of different embodiments that may or may not be combined depending on the application of such systems and/or the architecture of systems in which methods, as taught herein, are implemented. Such systems can include the one or more processors being operable to perform one or more functions. The one or more processors can be operable to control the replication of the application consistency group to the disaster recovery storage system with the replication being system driven, orchestrator driven, or time driven. The one or more processors can support synchronous replication and asynchronous replication of the application consistency group to the disaster recovery storage system. The one or more processors can be operable to make a dynamic change to the disaster recovery policy or the disaster recovery plan of a selected application consistency group. The one or more processors can be operable to control behaviour of the disaster recovery storage system.

FIG. 5 is a flow diagram of an embodiment of an example method 500 of disaster recovery. Method 500 can be implemented using a processing module having one or more processors that executes instructions, stored in a memory device or memory system, to perform operations with respect to a system. The one or more processors can be arranged as storage processors for a storage system. At operation 510, a replication of an application consistency group from a storage system received in a disaster recovery storage system. The application consistency group includes containerized applications, a disaster recovery plan, and a disaster recovery policy, with each containerized application having a consistency level. At operation 520, the received replication of the application consistency group is updated in the disaster recovery storage system with changes from the storage system in accordance with the disaster recovery plan or the disaster recovery policy. At operation 530, in response to the update, a disaster recovery status is returned to the storage system.

Variations of method 500 or methods similar to the method 500 can include a number of different embodiments that may be combined depending on the application of such methods and/or the architecture of devices or systems in which such methods are implemented. Such methods can include providing the updated received replication of the application consistency group to the storage system in response to receiving a callback from the storage system or an orchestrator to the storage system. Variations of method 500 or methods similar to the method 500 can include adjusting a behaviour of the disaster recovery storage system based on control from the storage system or an orchestrator to the storage system.

In various embodiments, a non-transitory machine-readable storage device, such as computer-readable non-transitory medium, can comprise instructions stored thereon, which, when performed by a machine, cause the machine to perform operations, where the operations comprise one or more features similar to or identical to features of methods and techniques described with respect to method 500, variations thereof, and/or features of other methods taught herein such as associated with FIGS. 1-6. The physical structures of such instructions may be operated on by one or more processors. For example, executing these physical structures can cause the machine to perform operations comprising receiving, in a disaster recovery storage system, a replication of an application consistency group from a storage system, the application consistency group including containerized applications, a disaster recovery plan, and a disaster recovery policy, with each containerized application having a consistency level; updating, in the disaster recovery storage system, the received replication of the application consistency group with changes from the storage system in accordance with the disaster recovery plan or the disaster recovery policy; and returning a disaster recovery status to the storage system in response to the update.

Operations can include providing the updated received replication of the application consistency group to the storage system in response to receiving a callback from the storage system or an orchestrator to the storage system. Operations can include adjusting a behaviour of the disaster recovery storage system based on control from the storage system or an orchestrator to the storage system.

In various embodiments, a disaster recovery storage system can comprise a memory storing instructions and one or more processors in communication with the memory, where the one or more processors execute the instructions. The one or more processors can be implemented as one or more storage processors. The instructions include instructions to receive a replication of an application consistency group from a storage system. The application consistency group includes containerized applications, a disaster recovery plan, and a disaster recovery policy, where each containerized application has a consistency level. The instructions include instructions to update the received replication of the application consistency group with changes from the storage system in accordance with the disaster recovery plan and the disaster recovery policy. The instructions include instructions to return a disaster recovery status to the storage system in response to the update.

Variations of such a system or similar systems can include a number of different embodiments that may or may not be combined depending on the application of such systems and/or the architecture of systems in which methods, as taught herein, are implemented. Such systems can include the one or more processors being operable to perform one or more functions. The one or more processors can be operable to provide the updated received replication of the application consistency group to the storage system in response to receiving a callback from the storage system or an orchestrator to the storage system. The one or more processors can be operable to adjust behaviour of the disaster recovery storage system based on control from the storage system or an orchestrator to the storage system.

In various embodiments, a system can comprise a memory storing instructions and one or more processors in communication with the memory, where the one or more processors execute the instructions. The one or more processors can be implemented as one or more storage processors. The one or more processors can execute the instructions to operate as one or more pseudo application programming interfaces. The one or more pseudo application programming interfaces can operate to generate or adjust an application consistency group in the system. The application consistency group includes containerized applications, a disaster recovery plan, and a disaster recovery policy. Each containerized application has a consistency level. The one or more pseudo application programming interfaces can include a create application consistency group pseudo application programming interface, a delete application consistency group pseudo application programming interface, and a register a component pseudo application programming interface. One or more pseudo application programming interfaces can be used in systems and methods associated components and operations of FIGS. 1-6.

The one or more pseudo application programming interfaces can include a freeze all pseudo application programming interface having an argument including a specified application consistency group, and an unfreeze all pseudo application programming interface having an argument including the specified application consistency group. These pseudo application programming interface can be directed to all components in the specified application consistency group.

The one or more pseudo application programming interfaces can include a create policy pseudo application programming interface, a delete policy pseudo application programming interface, and a modify pseudo application programming interface. These pseudo application programming interfaces can be based on user input.

The one or more pseudo application programming interfaces can include a next cycle policy pseudo application programming interface to start or end a replication cycle for the application consistency group.

The one or more pseudo application programming interfaces can include a stop all pseudo application programming interface to provide for all components in a specified application consistency group to enter a pause state and prepare for changes to the specified application consistency group.

The one or more pseudo application programming interfaces can include a restart all pseudo application programming interface to provide for all components in a specified application consistency group to start to function normally from a pause state.

Figure 6:
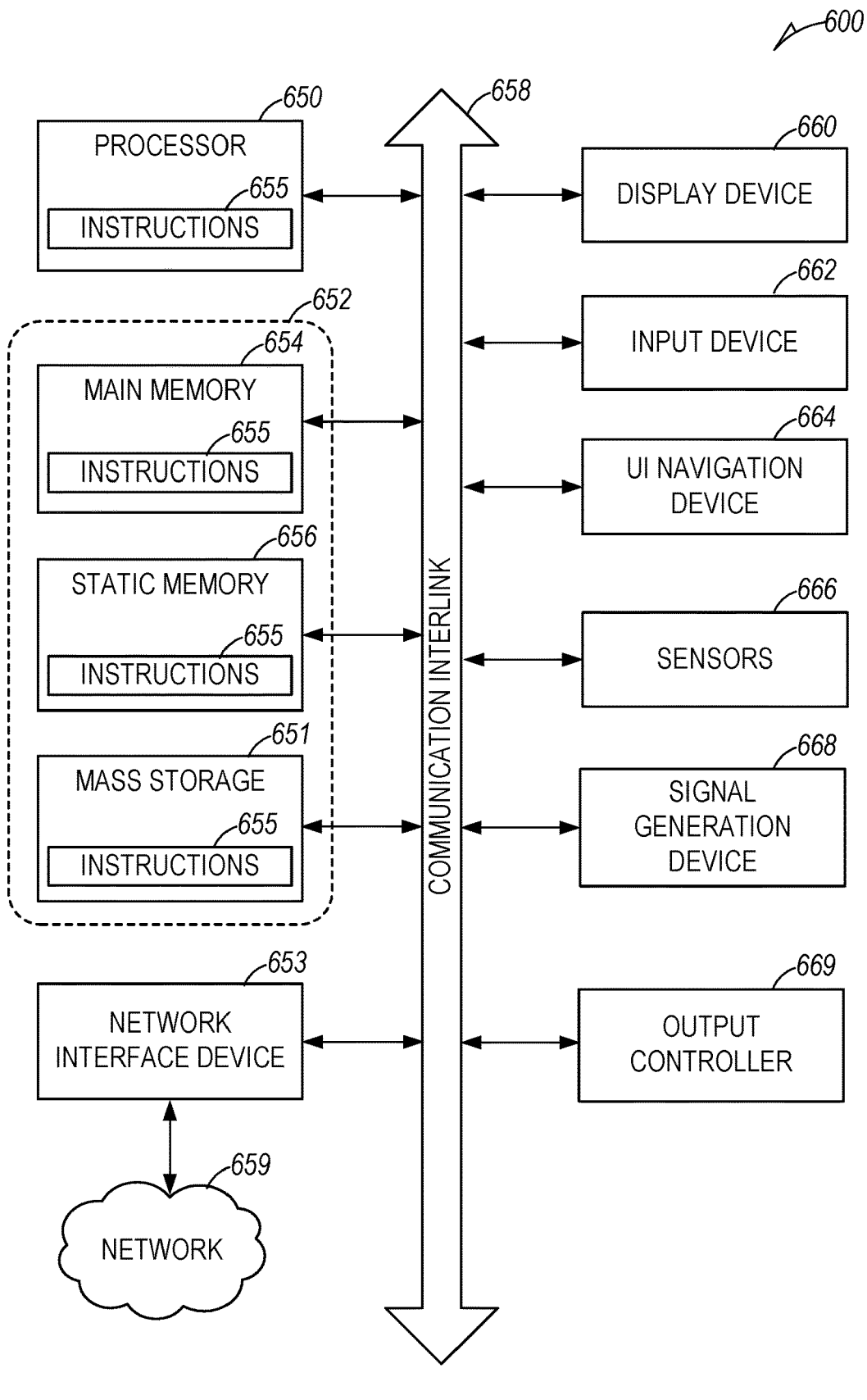
FIG. 6 is a block diagram illustrating components of a system that can implement algorithms and perform methods structured to conduct application-consistent disaster recovery for container-based applications, according to various embodiments.

FIG. 6 is a block diagram illustrating components of a system 600 that can implement algorithms and perform methods structured to conduct application-consistent disaster recovery for container-based applications, as taught herein. The system 600 can be implemented at a source site for data storage or at a DR site. The system 600 can include one or more processors 650 that can be structured to execute stored instructions to perform functions of a source site for data storage including performing functions for end-to-end control flow from storage of data to replication of data for disaster recovery readiness. The system 600 can include one or more processors 650 that can be structured to execute stored instructions to perform functions of a DR site in conjunction with a source site. The one or more processors 650 can be arranged as one or more storage processors. The one or more processors 650 can be realized by hardware processors.

The system 600 may operate as a standalone system or may be connected, for example networked, to other systems. In a networked deployment, the system 600 may operate in the capacity of a server machine, a client machine, or both in server-client network environments. In an example, the system 600 may act as a peer machine in peer-to-peer (P2P) (or other distributed) network environment. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), or other computing cluster configurations. The example system 600 can be arranged to operate with one or more other devices structured to perform application-consistent disaster recovery for container-based applications as taught herein.

Along with the one or more processors 650 (e.g., a CPU, a GPU, a hardware processor core, or any combination thereof), the system 600 can include a main memory 654, and a static memory 656, some or all of which may communicate with each other via an communication link 658. The communication link (e.g., bus) 658 can be implemented as a bus, a local link, a network, other communication path, or combinations thereof. The system 600 may further include a display device 660, an input device 662 (e.g., a keyboard), a user interface (UI) navigation device 664 (e.g., a mouse), and a signal generation device 668 (e.g., a speaker). In an example, the display device 660, input device 662, and UI navigation device 664 can be a touch screen display. The system 600 can include an output controller 669, such as a serial (e.g., USB, parallel, or other wired or wireless (e.g., infrared (IR), near field communication (NFC), etc.) connection to communicate or control one or more peripheral devices (e.g., a printer, card reader, etc.).

The system 600 can include a machine-readable medium 652 on which is stored one or more sets of data structures or instructions 655 (e.g., software or data) embodying or utilized by the system 600 to perform any one or more of the techniques or functions for which the system 600 is designed, including end-to-end control flow from storage to replication for disaster recovery readiness. The instructions 655 or other data stored on the machine-readable medium 652 can be accessed by the main memory 654 for use by the one or more processors 650. The instructions 655 may also reside, completely or at least partially, within the main memory 654, within the static memory 656, within a mass storage 651, or within the one or more processors 650.

While the machine-readable medium 652 is illustrated as a single medium, the term "machine-readable medium" can include a single medium or multiple media (e.g., a centralized or distributed database, or associated caches and servers) configured to store the instructions 655 or data. The term "machine-readable medium" can include any medium that is capable of storing, encoding, or carrying instructions for execution by the system 600 and that cause the system 600 to perform any one or more of the techniques to which the system 600 is designed, or that is capable of storing, encoding or carrying data structures used by or associated with such instructions. Non-limiting machine-readable medium examples can include solid-state memories, optical media, and magnetic media.

The data from or stored in machine-readable medium 652 or main memory 654 can be transmitted or received over a communications network 659 using a transmission medium via a network interface device 653 utilizing any one of a number of transfer protocols (e.g., frame relay, Internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 653 can include one or more physical jacks (e.g., Ethernet, coaxial, or phone jacks) or one or more antennas to connect to the communications network. In an example, the network interface device 653 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of carrying instructions to and for execution by the system 600, and includes instrumentalities to propagate digital or analog communications signals to facilitate communication of such instructions, which instructions may be implemented by software. The network interface device 653 can operate in conjunction with the network 659 to communicate between a source site for data storage or at a DR site correlated to the source site. The system 600 can be implemented in a cloud environment.

The components of the illustrative devices, systems, and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in a machine-readable storage device, for execution by, or to control the operation of, data processing apparatus such as a programmable processor, a computer, or multiple computers.

The various illustrative logical blocks, modules, and circuits described in connection with the embodiments disclosed herein may be implemented or performed with a general-purpose processor, a digital signal processor (DSP), an ASIC, a FPGA (field-programmable gate array) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. The processor and the memory can be supplemented by, or incorporated in special purpose logic circuitry.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. The above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system having disaster recovery capabilities, the system comprising:
   a memory storing instructions; and
   one or more processors in communication with the memory, wherein the one or more processors execute the instructions to:
      generate an application consistency group in the system, with the application consistency group including containerized applications, a disaster recovery plan, and a disaster recovery policy, with each containerized application having a consistency level, wherein the disaster recovery policy defines the consistency levels for the containerized applications, with the consistency levels selectable from a crash consistency to an end-to-end application consistency; and
      control a replication of the application consistency group from the system to a disaster recovery storage system according to the disaster recovery policy, the disaster recovery plan, and the consistency levels.

2. The system of claim 1, wherein the application consistency group includes configuration details and persistent volumes.

3. The system of claim 1, wherein the disaster recovery policy defines one or more of a recovery time objective, a recovery point objective, or a storage type for the disaster recovery storage system.

4. The system of claim 1, wherein the disaster recovery plan defines characteristics or operations of the containerized applications.

5. The system of claim 1, wherein the containerized applications include at least one stateful containerized application and at least one stateless containerized application.

6. The system of claim 1, wherein the replication of the application consistency group to the disaster recovery storage system is system driven, orchestrator driven, or time driven.

7. The system of claim 1, wherein one or more processors support synchronous replication and asynchronous replication of the application consistency group to the disaster recovery storage system.

8. The system of claim 1, wherein the one or more processors are operable to make a dynamic change to the disaster recovery policy or the disaster recovery plan.

9. A method of disaster recovery, the method comprising:
generating an application consistency group in a system, with the application consistency group including containerized applications, a disaster recovery plan, and a disaster recovery policy, with each containerized application having a consistency level, wherein the disaster recovery policy defines the consistency levels for the containerized applications, with the consistency levels selectable from a crash consistency to an end-to-end application consistency; and
controlling replication of the application consistency group from the system to a disaster recovery storage system according to the disaster recovery policy, the disaster recovery plan, and the consistency levels.

10. The method of claim 9, wherein the method includes:
wrapping up the application consistency group into a package at the system;
relocating the application consistency group to the disaster recovery storage system for unpackaging the application consistency group at the disaster recovery storage system as a replication application consistency group for storage at the disaster recovery storage system; and
receiving, at the system from the disaster recovery storage system, the replication application consistency group or parts of the replication application consistency group in response to an occurrence of an event.

11. The method of claim 9, wherein the disaster recovery policy defines one or more of a recovery time objective, a recovery point objective, or a storage type for the disaster recovery storage system.

12. The method of claim 9, wherein the disaster recovery plan defines characteristics or operations of the containerized applications.

13. The method of claim 9, wherein the containerized applications include a stateful containerized application and a stateless containerized application.

14. The method of claim 9, wherein the method includes driving the replication of the application consistency group to the disaster recovery storage system based on action by the system, action by an orchestrator, or time.

15. The method of claim 9, wherein the method includes using the disaster recovery policy to select use of synchronous replication or asynchronous replication.

16. The method of claim 9, wherein the method includes making a dynamic change to the disaster recovery policy or the disaster recovery plan, using one or more processors of the system.

17. A system comprising:
a memory storing instructions; and
one or more processors in communication with the memory, wherein the one or more processors execute the instructions to operate as one or more pseudo application programming interfaces to generate or adjust an application consistency group in the system, with the application consistency group including containerized applications, a disaster recovery plan, and a disaster recovery policy, with each containerized application having a consistency level.

18. The system of claim 17, wherein the one or more pseudo application programming interfaces include a create application consistency group pseudo application programming interface, a delete application consistency group pseudo application programming interface, and a register a component pseudo application programming interface.

19. The system of claim 17, wherein the one or more pseudo application programming interfaces include, directed to all components in a specified application consistency group, a freeze all pseudo application programming interface having an argument including the specified application consistency group, and an unfreeze all pseudo application programming interface having an argument including the specified application consistency group.

20. The system of claim 17, wherein the one or more pseudo application programming interfaces include, based on user input, a create policy pseudo application programming interface, a delete policy pseudo application programming interface, and a modify pseudo application programming interface.

* * * * *